United States Patent
Panousis et al.

(10) Patent No.: US 9,362,803 B2
(45) Date of Patent: Jun. 7, 2016

(54) HUMAN POWERED GENERATOR

(71) Applicants: Constantinos G Panousis, Pittsburgh, PA (US); George C. Panousis, Pittsburgh, PA (US)

(72) Inventors: Constantinos G Panousis, Pittsburgh, PA (US); George C. Panousis, Pittsburgh, PA (US)

(*) Notice: Subject to any disclaimer, the term of this patent is extended or adjusted under 35 U.S.C. 154(b) by 0 days.

(21) Appl. No.: 14/602,363

(22) Filed: Jan. 22, 2015

(65) Prior Publication Data
US 2015/0207384 A1    Jul. 23, 2015

Related U.S. Application Data

(60) Provisional application No. 61/930,045, filed on Jan. 22, 2014.

(51) Int. Cl.
  *A63B 22/02* (2006.01)
  *H02K 7/18* (2006.01)
  *F03G 5/06* (2006.01)
  *H02J 7/34* (2006.01)

(52) U.S. Cl.
  CPC .............. *H02K 7/1853* (2013.01); *F03G 5/06* (2013.01); *H02J 7/34* (2013.01); *Y10T 74/18152* (2015.01)

(58) Field of Classification Search
  CPC ....................................................... A63B 22/02
  USPC ............................................................. 482/54
  See application file for complete search history.

(56) References Cited

U.S. PATENT DOCUMENTS

| | | | | |
|---|---|---|---|---|
| 638,232 A * | 12/1899 | Fortier | ................. | A63B 21/023 200/19.18 |
| 3,861,215 A * | 1/1975 | Bradley | ............... | A63B 21/015 482/116 |
| 5,358,461 A * | 10/1994 | Bailey, Jr. | .......... | A63B 21/0053 290/1 R |
| 6,281,594 B1 * | 8/2001 | Sarich | ...................... | A43B 3/00 290/1 A |
| 6,365,981 B1 * | 4/2002 | Tokita | .................... | H02K 7/025 290/1 R |
| 7,638,889 B2 * | 12/2009 | Yeh | ....................... | H02K 7/1853 290/1 A |
| 2004/0043873 A1* | 3/2004 | Wilkinson | ......... | A63B 22/0005 482/54 |
| 2004/0183306 A1* | 9/2004 | Rome | ....................... | A45F 3/08 290/1 R |
| 2008/0277943 A1* | 11/2008 | Donelan | ................... | F03G 5/00 290/1 R |

* cited by examiner

*Primary Examiner* — Joseph Waks
(74) *Attorney, Agent, or Firm* — Cohen & Grigsby, P.C.

(57) ABSTRACT

A human powered electric energy generator equipped with a mechanism for converting a back and forth motion of a user's legs or arms to a unidirectional circular motion. The device includes an engaging mechanism that, according to the back and forth movement of a belt, enables a pilot gear to alternate engagement between a left and a right gear, and a transmission mechanism which transfers the linear kinetic energy from the belt to a unidirectional rotational kinetic energy of the gears. The device also includes a flywheel for storing the rotational kinetic energy of the gears and/or the transmission mechanism, and an electric generator for converting the rotational kinetic energy into electric energy.

20 Claims, 6 Drawing Sheets

HUMAN POWERED GENERATOR

BACKGROUND

1. Technical Field of the Invention

This invention pertains generally to a device and method for harvesting mechanical energy and converting the harvested mechanical energy into useable electrical energy. More specifically, the invention pertains to a device that provides a human powered source of electricity for an electric, electronic or mechanical appliance.

2. Description of the Related Art

In today's society more and more electronic devices have become portable, such as phones, laptops, tablets, MP3 players and the like. Their numbers and use are constantly increasing as it becomes possible to perform more and more applications with these devices. Such is the case with current mobile phones, where, in addition to their use as a telecommunications device, they can perform and are mainly used for numerous non-telephonic tasks. The extensive use of, and multiple functions of, these devices has increased in parallel their requirements for electrical energy. Almost all of these portable devices are dependent on rechargeable batteries for electrical power and need to be recharged frequently after the batteries have run out. In everyday life recharging these devices through standard power sources is easily accessible. There are certain situations, however, where this is not possible. Such is the case during outdoor activities, in areas where electricity is not available such as in the developing world or remote areas, or by army personnel during missions. In situations like these, there is a need for a device and method for generating electrical energy by non-traditional means such as, for example, by human or animal power.

There are several devices commercially available or under development which aim to fulfill this objective. For example, human energy harvesting devices include hand cranked generators, suspended load backpacks, biomechanical knee energy harvesters, solar-panel umbrellas, heel strike generators and other low output devices. Currently, none of these technologies are widely accepted; mainly because they are impractical, have high cost or produce little electrical power.

Accordingly, there exists a need for a device that provides a biomechanical generated source of electricity capable of providing electric power for an electric, electronic or mechanical appliance.

SUMMARY

The presently disclosed invention overcomes many of the shortcomings of the prior art by providing a low cost and easy to use device which is capable of harvesting a back and forth linear kinetic energy and converting it to a rotational kinetic energy which may be used for generating electric power sufficient to support one or more electric, electronic, or mechanical appliances.

According to its major aspects, and briefly stated, the presently disclosed invention includes a first embodiment directed to a device for harvesting a back and forth linear kinetic energy and converting it to a rotational kinetic energy. The device comprises a belt having a first belt end and a second belt end; a pilot gear having an axle, wherein the pilot gear is configured to engage a central portion of the belt and the axle is configured to be rotatably accepted within a slot; a left gear; a right gear; and a transmission mechanism which provides unidirectional rotation of the left gear and the right gear independent of the motion of the belt and the pilot gear. Movement of the belt to the left or right moves the pilot gear to the left or right within the slot so that the pilot gear becomes engaged alternatively with the left gear or the right gear.

Embodiments of the device may also include at least two pulleys which engage the belt and maintain an orientation of the belt parallel to a longitudinal axis of the slot. Further, the transmission mechanism may comprise a second left gear configured to engage the left gear; and a second right gear configured to engage the right gear, wherein the second left gear engages the second right gear and rotation of the left gear and the right gear is in opposite directions.

Certain further embodiments of the device may also include a flywheel for storing the rotational kinetic energy generated the left gear, the right gear, the transmission mechanism, or any combination thereof. The device may further include an electrodynamic generator for converting the rotational kinetic energy to an electrical energy, and an energy storage means. Exemplary energy storage means include batteries such as, for example, rechargeable batteries.

A second embodiment of the presently disclosed invention includes a device for harvesting biomechanical energy from a human. The device may comprise a belt having a first belt end and a second belt end, and a housing configured to be worn on a body of a human user. The housing may comprise a pilot gear having an axle, wherein the pilot gear is configured to engage a central portion of the belt and the axle is configured to be rotatably accepted within a slot; a left gear; a right gear; and a transmission mechanism which provides unidirectional rotation of the left gear and the right gear independent of the motion of the belt and the pilot gear. Movement of the belt to the left or right moves the pilot gear to the left or right within the slot so that the pilot gear becomes engaged alternatively with the left gear or the right gear. As such, the linear back and forth movement of the user's legs or arms move the belt to the left or the right.

Embodiments of the biomechanical device may also include at least two pulleys which engage the belt and maintain an orientation of the belt parallel to a longitudinal axis of the slot. Further, the transmission mechanism may comprise a second left gear configured to engage the left gear; and a second right gear configured to engage the right gear, wherein the second left gear engages the second right gear and rotation of the left gear and the right gear is in opposite directions.

Certain further embodiments of the biomechanical device may also include a flywheel for storing the rotational kinetic energy generated the left gear, the right gear, the transmission mechanism, or any combination thereof. The device may further include an electrodynamic generator for converting the rotational kinetic energy to an electrical energy, and energy storage means. Exemplary energy storage means include batteries such as, for example, rechargeable batteries.

The biomechanical device may be supported at a location on the front of the user's body. Further, the housing may be supported at a location on the front of the user's body by a band attached at the waist, and the first belt end may attached to a lower part of a thigh above a first knee and the second belt end may be attached to a lower part of a thigh above a second knee.

In certain embodiments of the biomechanical device, the housing may be supported about the waist of the user at a position forward from a point of rotation of the hip such that, when the user takes a step forward, the belt moves to the left or right resulting in an unequal belt length between (a) the first end of the belt and the pilot gear, and (b) the second end of the belt and the pilot gear.

A third embodiment of the presently disclosed invention is directed to a method for converting a back and forth movement of human legs to electrical energy. The method comprises attaching a belt of a human powered generator device to the legs of a user, wherein a first belt end is attached about a first leg and a second belt end is attached about a second leg. The method further comprises attaching a housing portion of the human powered generator device about a midsection of the user. The housing portion comprises a pilot gear having an axle, wherein the pilot gear is configured to engage a central portion of the belt and the axle is configured to be rotatably accepted within a slot; a left gear; a right gear; and a transmission mechanism which provides unidirectional rotation of the left gear and the right gear independent of the motion of the belt and the pilot gear.

Movement of the belt to the left or right moves the pilot gear to the left or right within the slot so that the pilot gear becomes engaged alternatively with the left gear or the right gear. Thus, the method includes walking in a forward direction so that a linear back and forth movement of the user's legs moves the belt to the left or the right.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

Figure 1:
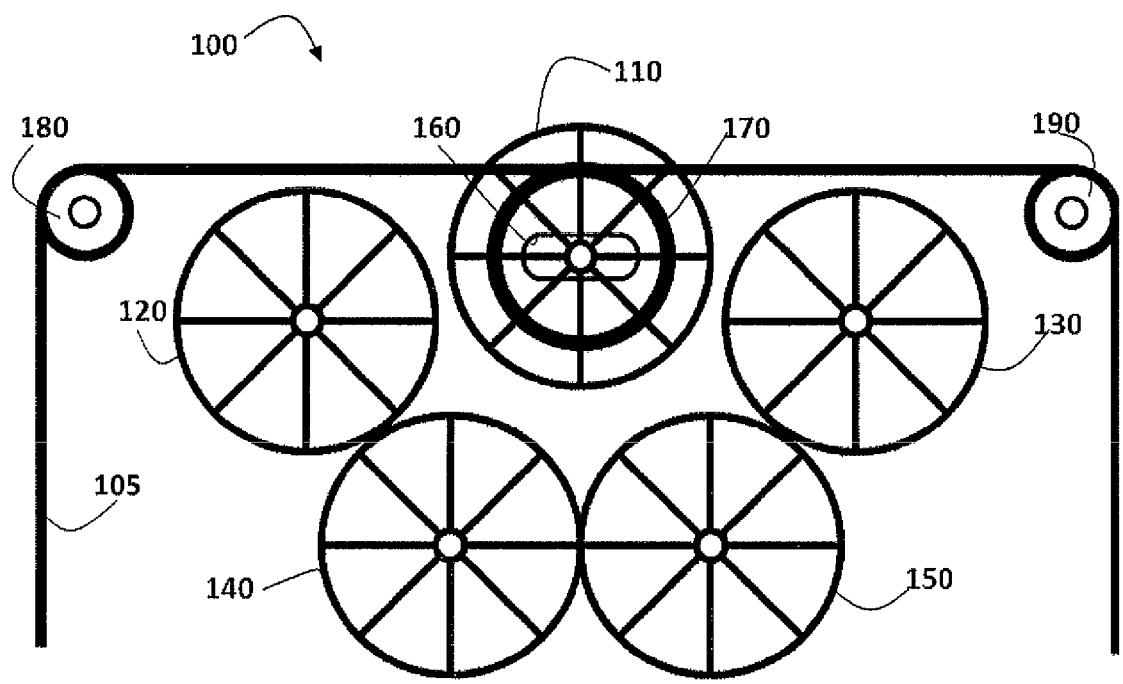
FIG. 1 is a schematic diagram of a mechanism that converts a linear back and forth motion to a circular motion, including the pilot gear, the transmission gears and the connecting string or belt in accordance with certain aspects of the present invention.

In the following description, the present invention is set forth in the context of various alternative embodiments and implementations of a device for harvesting a back and forth kinetic energy and converting it to a rotational kinetic energy. The device may then convert and/or store the rotational kinetic energy as electrical energy. In certain configurations, the device may be a biomechanical energy harvester which utilizes a back and forth motion of human arms or legs to generate power sufficient to operate an electric, electronic or mechanical appliance. Specifically, the human powered generator device may convert the back and forth motion of the user's arms or legs to a circular unidirectional motion which may be used and/or stored as electrical energy.

In the following description, embodiments of the presently disclosed invention will be referred to as a device or generator, while the electric, electronic or mechanical devices which may be powered using the device of the presently disclosed invention will be referred to as appliances. Such a distinction is used to avoid confusion and to improve clarity of the description of the device disclosed herein.

Various aspects of the human powered generator of the presently disclosed invention may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the human powered generator of the presently disclosed invention may be illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the human powered generator of the presently disclosed invention in addition to the orientation depicted in the drawings. By way of example, if aspects of the human powered generator of the presently disclosed invention shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Thus, for example, reference to a "gear" is a reference to one or more gears and equivalents thereof known to those skilled in the art, and so forth. Unless defined otherwise, all technical and scientific terms used herein have the same meanings as commonly understood by one of ordinary skill in the art.

It will be appreciated that the following embodiments and implementations are illustrative and various aspects of the invention may have applicability beyond the specifically described contexts. Furthermore, it is to be understood that these embodiments and implementations are not limited to the particular components, methodologies, or protocols described, as these may vary. The terminology used in the description is for the purpose of illustrating the particular versions or embodiments only, and is not intended to limit their scope in the present disclosure which will be limited only by the appended claims.

Referring now to the drawings, embodiments of the human powered generator of the presently disclosed invention are shown in FIGS. 1-4 generally designated by reference number 100. FIG. 1 is a schematic diagram of a portion of a device 100 that converts a linear back and forth motion to a circular motion. Shown is a pilot gear 110, transmission gears (120, 130, 140, 150) and a connecting string or belt 105.

The main pilot gear 110 of the device 100 may include an axle which may be accepted into a slot 106. The slot 106 may allow the main pilot gear 110 to rotate and provide a track will allows horizontal movement of the gear 110 when the device 100 is in use. The axle allows the pilot gear 110 to move horizontally within the slot 160, so that the circular motion of the gear 110 is co-planar with the longitudinal axis of the slot. At the middle or neutral position within the slot 160, the pilot gear 110 is not in engagement with any other gears. Horizontal movement within in the slot 160 allows the pilot gear 110 to become engaged with either a left gear 120 or a right gear 130.

A drum or gear 170 is coaxially fixed to the pilot gear 110, and a string or belt 105 is operably connected to the drum or gear 170. For example, the string or belt 105 may be wrapped around or alternatively engaged on one side thereof to the drum or gear 170. Further, a larger diameter ring (not shown) may be attached to the drum or gear 170 to secure the string or belt 105 in place. Two pulleys (180, 190) may keep the orientation of a portion of the string or belt 105 parallel to the slot 160, as shown in FIG. 1.

In use, pulling the string or belt 105 left or right may allow analogous left or right movement of the pilot gear 110 in the slot 160. Once the pilot gear 110 reaches an end of the slot 160, or is in a stopped position, the gear 110 may become engaged with either the left gear 120 or the right gear 130. Further, upon reaching this stopped position, the pilot gear 110 may begin to rotate as the string or belt 105 continues to be pulled to the left or right. The stopped position of the pilot gear 110 may occur when it reaches an end of the slot 160 or becomes engaged with either the left gear 120 or the right gear 130, which may occur at a position within the slot 160 that is before the left or right end of the slot.

With continued reference to FIG. 1, the device may comprise a transmission mechanism which includes four gears (120, 130, 140, 150) engaged in sequence. Alternatively, the transmission mechanism may incorporate any number of gears, belts or screws between the left gear 120 and the right gear 130 that allow the rotational directions of the left gear 120 and the right gear 130 in the transmission mechanism to remain opposite.

Figure 2A:
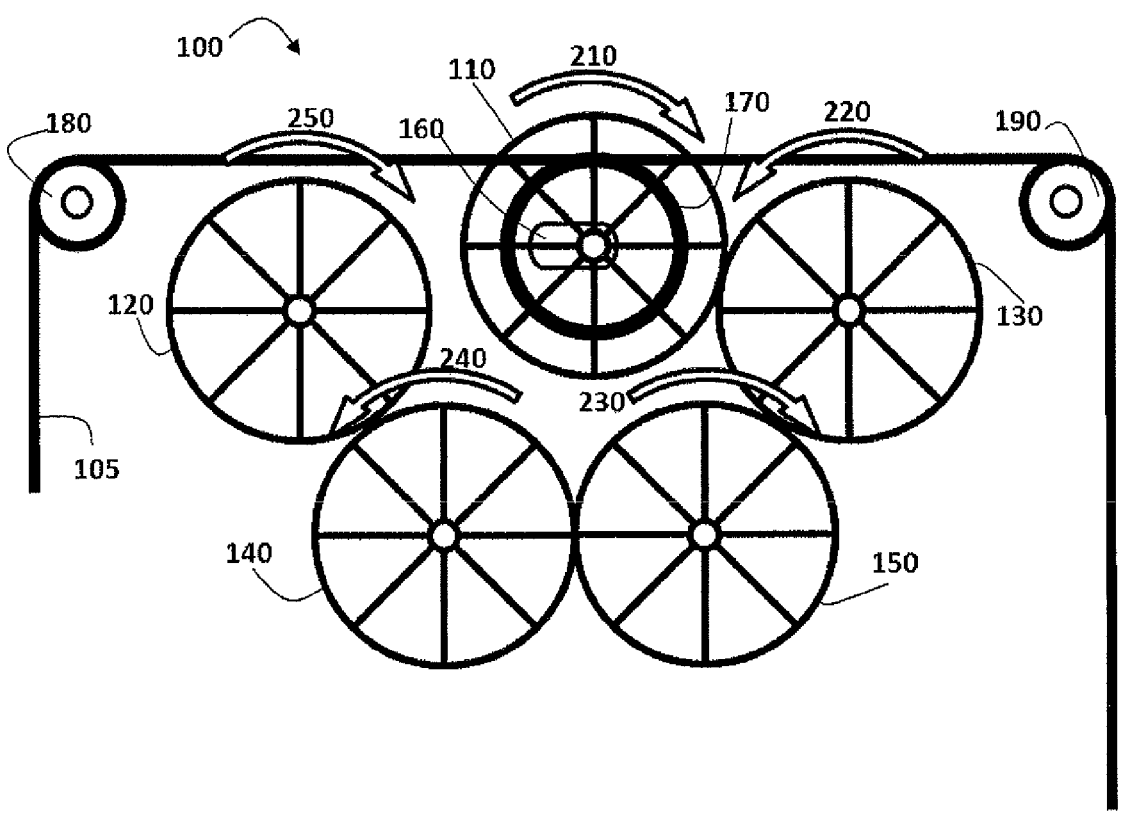
FIG. 2A is a schematic diagram depicting engagement of the pilot gear upon moving the belt or string to the left and rotation of the transmission gears in accordance with certain aspects of the present invention.

Pulling the string or belt 105 to the right, as depicted in FIG. 2A, causes the pilot gear 110 to move to the right within the horizontal slot 160 and come to rest in a stopped position (e.g. at the right end of the slot 160 or when the pilot gear 110 engages the right gear 130). Once the pilot gear 110 engages the right gear 130, the continued linear motion of the string or belt 105 to the right causes the pilot gear 110 to start rotating clockwise (arrow 210) causing the right gear 130 to move counterclockwise (arrow 220). The counterclockwise movement (arrow 220) of the right gear 130 produces clockwise movement (arrow 230) of the second right gear 150, counterclockwise movement (arrow 240) of the second left gear 140, and clockwise movement (arrow 250) of the left gear 120.

Figure 2B:
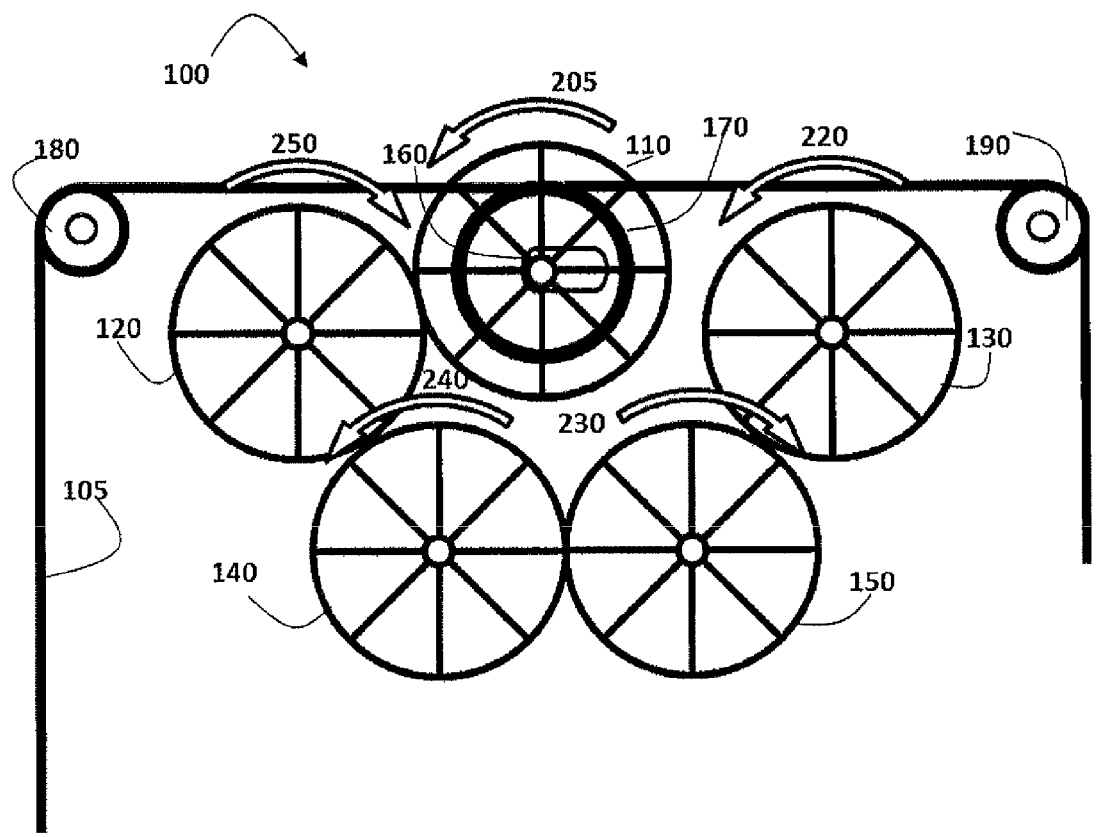
FIG. 2B is a schematic diagram depicting engagement of the pilot gear upon moving the belt or string to the right and rotation of the transmission gears in accordance with certain aspects of the present invention.

Pulling the string or belt to the left, as depicted in FIG. 2B, causes the pilot gear 110 to move to the left within the horizontal slot 160 and to come to rest in a stopped position (e.g. at the left end of the slot 160 or when the pilot gear 110 engages the left gear 120). Once the pilot gear 110 engages the left gear 120, the continued linear motion of the string or belt 105 to the left causes the pilot gear 110 to start rotating counterclockwise (arrow 205) causing the left gear 120 to move clockwise (arrow 250). The clockwise movement (arrow 250) of the left gear 120 produces counterclockwise movement (arrow 240) of the second left gear 140, clockwise movement (arrow 230) of the second right gear 150, and counterclockwise movement (arrow 220) of the right gear 130.

Using this mechanism of kinetic energy transmission, the back and forth motion of the string or belt 105 may be converted to a circular motion, causing the gears in the transmission mechanism (120, 130, 140, 150) to rotate in the same direction independently of the movement of the string or belt 105. Alternatively, as stated above, a combination of gears and/or belts may be used to achieve the same result. For example, the same conversion of a back and forth motion of the string or belt 105 to a unidirectional circular motion may be achieved by eliminating the second right gear 150 and connecting the right gear 130 to the second left gear 140 by using a belt, or by eliminating the second left gear 140 and connecting the left gear 120 to the second right gear 150 by using a belt. Other means for this conversion include directly connecting the left gear 120 and the right gear 130 using a crisscross belt, or any other combination that has as a result a transmission mechanism wherein the left gear 120 and the right gear 130 rotate in opposite directions, and thus allow the direction of movement of the pilot gear 110 and string or belt 105 to remain independent of the rotational direction of the right gear 120 and the left gear 130.

Figure 3:
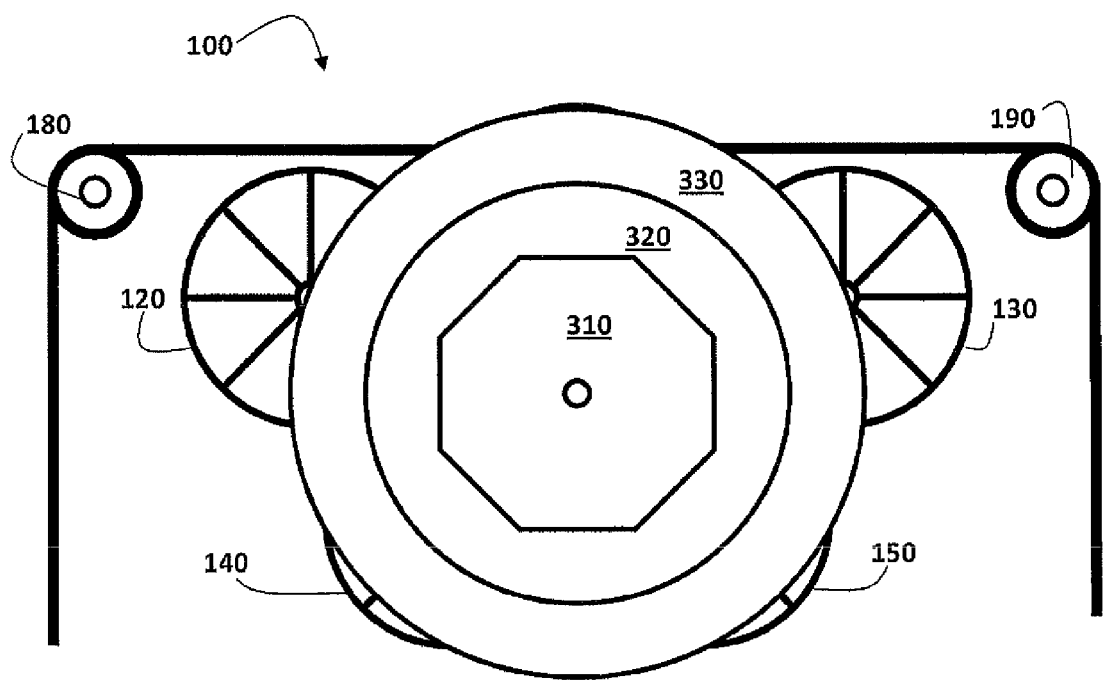
FIG. 3 is a schematic diagram showing the device with incorporation of a flywheel and a coaxially attached rotary electrodynamic generator in accordance with certain aspects of the present invention.

In embodiments of the device, the unidirectional movement of the transmission mechanism allows incorporation of a flywheel, as shown in FIG. 3 (330), for optionally storing the kinetic energy generated by the rotational motion of at least the left gear 120 and the right gear 130. Since a flywheel 330 may have a significant moment of inertia, it will generally be resistant to changes in speed, such as differences in rotational speed of the gears in the transmission mechanism (120, 130, 140, 150). Thus, a flywheel 330 may allow for smooth operation of the device 100 during each movement of the string or belt 105 to the left or right. The stored kinetic energy of the flywheel 330 may be used to drive a mechanical appliance.

The flywheel 330 may be coaxially fixed to any of the gears of the transmission mechanism (120, 130, 140, 150) or may be independently driven by an extra gear or belt as shown in FIG. 3, which is located in this embodiment at the center of the device. The transmission mechanism (120, 130, 140, 150) may also drive an electrical generator 310 that is coaxially fixed to any of the gears of the transmission mechanism (120, 130, 140, 150), or engaged through an independent gear or belt, or coaxially fixed with the flywheel as shown in FIG. 3. Power to the flywheel 330 and the electrical generator 310 may be transferred by a clutch mechanism 320.

Furthermore, on regulating the system during acceleration and deceleration of the flywheel (i.e., acceleration after each movement of the belt or string 105 to the left or right and deceleration during discharge), a power electronic conversion system may be used for generating a constant voltage that can power or charge an electrical, or electronic appliance (not shown). When not connected to any appliance, and while in use, the system can charge batteries or capacitors incorporated in to the electronic system, storing generated electrical power for future use.

Embodiments of the device of the presently disclosed invention may be configured to harness the biomechanical energy from the back and forth motion of a human or animal during locomotion. For example, the device may be configured to harness the back and forth motion of a human's legs as they walk, jog or run (see FIG. 4). In alternative embodiments, the device may harvest the biomechanical energy created by pulling the string or belt 105 back and forth using the hands of a human, or the device may be attached to a human user's arms. Such a method of use would provide for the production of power by the device even when the human user is not walking, jogging or running. Thus, the device may be operated while attached to a human user's legs while they are moving, or may be operated by the human user's hands or arms when the user needs to remain in one location (i.e. when they are seated or are not walking, jogging or running).

Figure 4A:
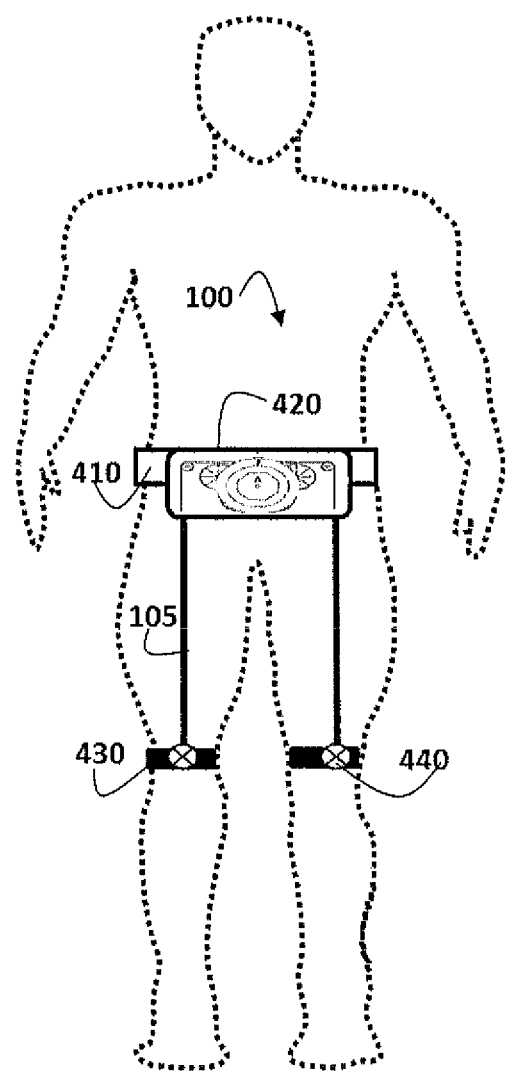
FIG. 4A is a schematic diagram showing attachment of the device to the human body and attachment of the string or belt to the legs in accordance with certain aspects of the present invention.

Embodiments of the device of the presently disclosed invention may harvest energy from a user's legs, where the strongest muscles of the body are located, while allowing free and unimpeded body movement. Thus, the user's hands are free to perform daily activities. Further, the device does not restrict leg movement so that activities such as walking, sitting, going up and down stairs, and the like are not compromised. The aforementioned benefits may be achieved, as shown in FIG. 4A, by locating the device 100 in the front of the body 400 and supported by a band 410 around the waist. The pilot gear, transmission mechanism, flywheel and electric generator may be contained within a housing 420 which is attachable to the band 410.

The device may further comprise an outlet or port which may allow the appliance to be supplied with the electrical power generated by the device. Alternatively, or in addition to the outlet or port, the device may be configured to charge one or more rechargeable batteries that may be used to provide power to an appliance. As such, the batteries may be removable from the device so that they may be used in the appliance, or may remain within the device and the electrical power stored within the batteries may be accessed by the appliance through an outlet or port.

The string or belt 105 may be a replaceable component of the device 100. For example, after long term use, or in the event of damage to the string or belt 105, the housing 420 of the device 100 may be configured to allow access to, and removal of, the string or belt 105. Exemplary methods to allow access to the string or belt 105 include a door in the housing 420, or a two component housing that may be separated to expose the string or belt 105.

The ends of the string or belt 105 that is transmitting the back and forth kinetic energy of the user's legs to the device 100 may be attached at attachment point (430, 440) which may be or the user's legs above the knee, and may be secured using any fastening means known in the art. Additionally, the band 410 which supports the housing 420 and a portion of the string or belt 105 may be secured around a user's waist by any means known in the art. Examples include a band wherein at least a portion comprises hook and loop fasteners, such as those marketed under the Velcro® trademark by Velcro U.S.A. Inc. of Manchester, N.H., U.S.A. One skilled in the art will readily recognize that various other fastening means could be employed with similar utility in embodiments of the present invention. For example, a band having the synthetic adhesive referred to as (http://nanolab.me.cmu.edu) "gecko-hair", or the resilient tacky polymer well known in the toy industry as "Sticky Buddies", or standard clip closures, magnetic closures, hook closures, snap closures, elastic band, or any combination of the above are all within the scope of the presently disclosed invention.

Once the ends of the string or belt 105 are attached via the attachment point (430, 440) at a point on the human user's leg which is at or above the knee, upward movement of the ends of the string or belt 105 is restricted due to the increased diameter of the thigh muscles. Alternatively, other methods and/or locations for attachment are envisioned, such as attachment to a garment (e.g. the legs of a pair of pants), or a garment where both the attachment point (430, 440) and the string or belt 105 are incorporated into the garment's design. By connecting the knee to the waist, the movement of the thigh is followed. Further, by placing the device in the front of the user's body, thigh movement is not compromised. Since the thigh rotates forward and sideways around the hip, both movements are allowed when the device is placed at the front of the body. Alternatively, placing the device at the back of the body compromises the forward movement of the leg, and tasks such as sitting would not be possible. Backward movement of the hip is restricted by nature, and thus any restriction of the backward movement by the device when placed on the front of the user's body is irrelevant.

Figure 4B:
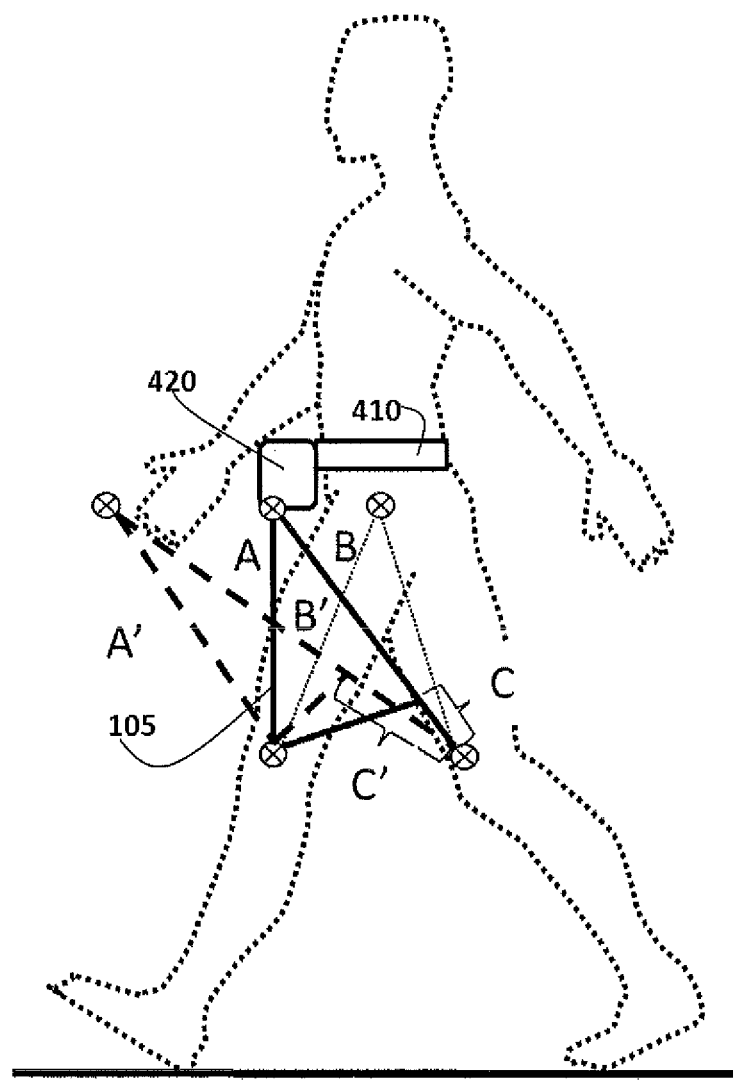
FIG. 4B is a schematic diagram showing the generated differences in length between the device and the knee upon walking and placement of the attachment point of the string or belt on the device in accordance with certain aspects of the present invention.

The back and forth motion of the user's legs is converted to a linear back and forth motion of the string or belt 105 by placing the attachment point of the string or belt at a point forward of the point of rotation of the user's hip, as shown in FIG. 4B. Having an attachment point of the string or belt 105 to the housing 420 at the point of hip rotation does not result in any difference in the length between forward and backwards movement of the leg, as it is depicted in FIG. 4B by the dotted line where an isosceles triangle is formed by the knee attachment points and the hip. In contrast, by moving the attachment point forward, a difference in the length is formed. As shown in FIG. 4B by the solid lines, the distance from the knee to the device (labeled A) for the left leg during a forward step is shorter than that of the right leg, (labeled B) by a definable length (labeled C). This difference would be the opposite during the next step when the right leg moves forward, allowing the conversion of the kinetic energy of walking to a linear back and forth motion of the string or belt 105 through the device. The more forward the attachment point is, the larger the back and forth movement of the string or belt as depicted for demonstration purposes on FIG. 4B by the dashed line, wherein A' is the distance from the device for the left knee, B' the distance from the device for the right knee, and C' is the difference that is formed during walking. Thus, the placement of the device at the front of the body and at a specific position forward from the hip may be used to regulate the amount of power produced by the human user.

Thus, the presently disclosed invention introduces a new mechanism to convert the back and forth motion, such as the motion of human legs or arms, to a circular unidirectional motion. The device may incorporate a flywheel for storing the generated kinetic energy of the unidirectional circular motion. The flywheel may be linked to a rotary electrodynamic generator which, under the current energy harvesting technologies, provides more power output at less cost than photovoltaic, thermoelectric, electrodynamic or piezo vibration harvesters. As such, the presently disclosed invention differs from existing technologies such as, for example, pedal powered generators, dynapods, biomechanical knee harvesters, or hand cranked mechanisms.

The presently disclosed invention identifies the front of the body as the proper location of the human powered generator, as it allows free movement of the hip forward and/or sideways. Movement of the hip backwards, even though it is restricted by the device, is also restricted by nature and thus has no overall effect on the efficiency of the device. By comparison, placement of the device in the back of the body would restrict forward movement and interfere with regular activities such as sitting. Thus, the device of the presently disclosed invention may be attached to or worn by a user at the front of the body without interfering with the regular activities of the user.

Furthermore, the presently disclosed invention identifies that by moving the point of attachment of the string or belt to the device forward, or forwards and downwards, from the point of hip rotation generates a difference in the length between the knee and the device. This difference may be used to harvest the kinetic energy from the leg movement. As such, the placement of the device may be used to regulate the amount of power produced by the human user.

The presently disclosed invention further includes a method for converting the back and forth movement of a human's legs to electrical energy. The method comprises attaching a belt of a human powered generator device to the legs of a user. That is, a first belt end may be attached about a first leg of the user and a second belt end may be attached about a second leg of the user. The attachment point is preferably on a lower portion of the user's thigh, above the knee. A housing portion of the device may be about a midsection of the user, such as at the user's waist. The order of attachment of the housing section and the belt may depend on the user's preference. That is, the user may choose to attach the housing about the waist and then the belt ends to the legs, or vice versa.

The housing portion may comprises a pilot gear having an axle, wherein the pilot gear is configured to engage a central portion of the belt and the axle is configured to be rotatably accepted within a slot; a left gear; a right gear; and a transmission mechanism which provides unidirectional rotation of the left gear and the right gear independent of the motion of the belt and the pilot gear.

Movement of the belt to the left or right moves the pilot gear to the left or right within the slot so that the pilot gear becomes engaged alternatively with the left gear or the right gear. Thus, the method includes walking in a forward direction so that a linear back and forth movement of the user's legs moves the belt to the left or the right.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A device for harvesting a back and forth linear kinetic energy and converting it to a rotational kinetic energy, the device comprising:
    a belt having a first belt end and a second belt end;
    a pilot gear having an axle, wherein the pilot gear is configured to engage a central portion of the belt and the axle is configured to be rotatably accepted within a slot;
    a left gear;
    a right gear; and
    a transmission mechanism which provides unidirectional rotation of the left gear and the right gear independent of the motion of the belt and the pilot gear,
wherein movement of the belt to the left or right moves the pilot gear to the left or right within the slot so that the pilot gear becomes engaged alternatively with the left gear or the right gear.

2. The device of claim 1, further comprising:
    at least two pulleys which engage the belt and maintain an orientation of the belt parallel to a longitudinal axis of the slot.

3. The device of claim 1, wherein the transmission mechanism comprises:
    a second left gear configured to engage the left gear; and
    a second right gear configured to engage the right gear,
wherein the second left gear engages the second right gear and rotation of the left gear and the right gear is in opposite directions.

4. The device of claim 1, further comprising:
    a flywheel for storing the rotational kinetic energy generated the left gear, the right gear, the transmission mechanism, or any combination thereof.

5. The device of claim 1, further comprising:
    an electrodynamic generator for converting the rotational kinetic energy to an electrical energy.

6. The device of claim 1, further comprising:
    an energy storage means.

7. The device of claim 6, wherein the energy storage means is comprised of rechargeable batteries.

8. A device for harvesting biomechanical energy, the device comprising:
    a belt having a first belt end and a second belt end; and
    a housing configured to be worn on a body of a human user, the housing comprising:
        a pilot gear having an axle, wherein the pilot gear is configured to engage a central portion of the belt and the axle is configured to be rotatably accepted within a slot;
        a left gear;
        a right gear; and
        a transmission mechanism which provides unidirectional rotation of the left gear and the right gear independent of the motion of the belt and the pilot gear,
        wherein movement of the belt to the left or right moves the pilot gear to the left or right within the slot so that the pilot gear becomes engaged alternatively with the left gear or the right gear,
    wherein the linear back and forth movement of a user's legs or arms move the belt to the left or the right.

9. The device of claim 8, further comprising:
    at least two pulleys which engage the belt and maintain an orientation of the belt parallel to a longitudinal axis of the slot.

10. The device of claim 8, wherein the transmission mechanism comprises:
    a second left gear configured to engage the left gear; and
    a second right gear configured to engage the right gear,
wherein the second left gear engages the second right gear and rotation of the left gear and the right gear is in opposite directions.

11. The device of claim 8, further comprising:
    a flywheel for storing the rotational kinetic energy generated by the left gear, the right gear, the transmission mechanism, or any combination thereof.

12. The device of claim 8, further comprising:
    an electrodynamic generator for converting the rotational kinetic energy to an electrical energy.

13. The device of claim 8, further comprising:
    an energy storage means.

14. The device of claim 13, wherein the energy storage means is comprised of rechargeable batteries.

15. The device of claim 8, wherein the device is supported at a location on the front of the user's body.

16. The device of claim 8, wherein the housing is supported at a location on the front of the user's body by a band attached at the waist.

17. The device of claim 8, wherein the first belt end is attached to a lower part of a thigh above a first knee and the second belt end is attached to a lower part of a thigh above a second knee.

18. The device of claim 17, wherein the housing is supported about the waist of the user at a position forward from a point of rotation of the hip such that, when the user takes a step forward, the belt moves to the left or right resulting in an unequal belt length between (a) the first end of the belt and the pilot gear, and (b) the second end of the belt and the pilot gear.

19. A method for converting a back and forth movement of human legs to electrical energy, the method comprising:
    attaching a belt of a human powered generator device to the legs of a user, wherein a first belt end is attached about a first leg and a second belt end is attached about a second leg;
    attaching a housing portion of the human powered generator device about a midsection of the user, wherein the housing comprises:
        a pilot gear having an axle, wherein the pilot gear is configured to engage a central portion of the belt and the axle is configured to be rotatably accepted within a slot;
        a left gear;
        a right gear; and
        a transmission mechanism which provides unidirectional rotation of the left gear and the right gear independent of the motion of the belt and the pilot gear, wherein movement of the belt to the left or right moves the pilot gear to the left or right within the slot so that the pilot gear becomes engaged alternatively with the left gear or the right gear; and
    walking in a forward direction so that a linear back and forth movement of the user's legs moves the belt to the left or the right.

20. The method of claim 19, wherein the housing is supported about the waist of the user at a position forward from a point of rotation of the hip such that, when the user takes a step forward, the belt moves to the left or right resulting in an unequal belt length between (a) the first end of the belt and the pilot gear, and (b) the second end of the belt and the pilot gear.

* * * * *